United States Patent
Katou et al.

(10) Patent No.: US 6,836,539 B2
(45) Date of Patent: Dec. 28, 2004

(54) MACHINE REMOTE MONITORING SYSTEM AND MANAGEMENT METHOD

(75) Inventors: Hironori Katou, Saitama (JP); Naoya Toida, Saitama (JP); Ryuichi Kimata, Saitama (JP); Yoshihisa Shinogi, Saitama (JP); Kousei Yamashita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 255 days.

(21) Appl. No.: 10/058,130

(22) Filed: Jan. 29, 2002

(65) Prior Publication Data

US 2002/0114433 A1 Aug. 22, 2002

(30) Foreign Application Priority Data

Feb. 20, 2001 (JP) ........................................ P2001-43668

(51) Int. Cl.[7] ............................................. H04M 11/00
(52) U.S. Cl. ..................... 379/106.01; 701/33; 455/557
(58) Field of Search .................. 379/106.01, 102.01, 379/27.01, 28; 700/110, 109, 121, 177; 399/8–12; 714/47, 48; 701/32, 33, 30; 455/556.1, 557; 73/114, 115, 117 A (56) References Cited

U.S. PATENT DOCUMENTS

| | | | | |
|---|---|---|---|---|
| 4,390,953 A | * | 6/1983 | Johnstone | 379/102.01 |
| 5,325,156 A | * | 6/1994 | Ulinski | 399/8 |
| 5,367,667 A | * | 11/1994 | Wahlquist et al. | 714/32 |
| 5,708,909 A | * | 1/1998 | Yamashita et al. | 399/8 |
| 5,774,529 A | * | 6/1998 | Johannsen et al. | 379/106.03 |
| 5,835,816 A | * | 11/1998 | Sawada et al. | 399/8 |
| 5,987,105 A | * | 11/1999 | Jenkins et al. | 379/106.01 |
| 6,181,994 B1 | * | 1/2001 | Colson et al. | 701/33 |
| 6,256,594 B1 | | 7/2001 | Yamamoto et al. | 702/185 |
| 6,330,499 B1 | * | 12/2001 | Chou et al. | 701/33 |
| 6,385,497 B1 | * | 5/2002 | Ogushi et al. | 700/110 |
| 6,487,479 B1 | * | 11/2002 | Nelson | 701/29 |
| 6,628,764 B1 | * | 9/2003 | Petite | 379/106.01 |
| 6,647,769 B1 | * | 11/2003 | Fujino et al. | 73/119 A |
| 6,688,163 B2 | * | 2/2004 | Fujino et al. | 73/116 |
| 6,691,023 B2 | * | 2/2004 | Fujino et al. | 701/114 |

FOREIGN PATENT DOCUMENTS

| | | |
|---|---|---|
| JP | 7-273714 | 10/1995 |
| JP | 11-65645 | 3/1999 |

* cited by examiner

Primary Examiner—Wing F. Chan
(74) Attorney, Agent, or Firm—Westerman, Hattori, Daniels & Adrian, LLP (57) ABSTRACT

An operating condition of an outboard motor 1 is detected by an ECU 3, and then, is transmitted to a remote monitoring apparatus 6 using a mobile phone 5. The condition data transmission is made by only access from the outboard motor 1 side, therefore, security can be secured. When confirming a failure based on the condition data, the remote monitoring apparatus 6 decides the cause of failure by troubleshooting, and then, give information about measures to a boat 2 equipped with the outboard motor 1. Troubleshooting is carried out by acquiring a program from a server of maker, and the cause of failure is transmitted to the server so as to be stored as user information. The remote monitoring apparatus 6 orders necessary maintenance parts so as to improve quickness of maintenance.

14 Claims, 6 Drawing Sheets

```
USER INFORMATION
             USER: MR. ICHIRO YAMADA
          ADDRESS: D STREET 3320
   TYPE OF MACHINE: ABC TYPE
   CONTRACT CONTENT: PROVIDING INFORMATION
             MAIL: xyz@abc.net
```

( MAP )    ( MAIL )

Fig. 10

```
X CORPORATION GENERAL-USE TROUBLESHOOTING
(RESULT)
      TYPE OF MACHINE: ABC TYPE
                  ID: 11111
        TROUBLE NAME: OVERHEAT
      ESTIMATED CAUSE: NOT DECIDED
          PHONE NO. : 090-1234-5678
```

( DETAILED TROUBLESHOOTING )

Fig. 11

```
INTERNET MAINTENANCE INFORMATION SERVICE

MR. YAMADA'S POSSESSION
       ☐  OUTBOARD MOTOR: TYPE ABC
       ☐        GENERATOR: TYPE EF90
```

Fig. 12

```
INTERNET MAINTENANCE INFORMATION SERVICE

OUTBOARD MOTOR: ABC TYPE (NO.012345)
    NUMBER OF HOURS WORKS:           1234H
    ENGINE CONDITION:                GOOD
    MAINTENANCE INFORMATION:         ORDER
       OIL CHANGE:    RIGHT TIMING!      ☐
       PLUG CHANGE:   10 HOURS LEFT
                      FOR PLUG CHANGE    ☐

( AUCTION )    ( OK )
```

Fig. 13

```
INTERNET MAINTENANCE INFORMATION SERVICE

ORDER
       PARTS P: ¥1200 PER ONE
             NAME: MR. ICHIRO YAMADA
          ADDRESS: D STREET 3320
         PHONE NO.: 045-987-6543
          CARD NO.: 9876-5432-1098

( OK )    ( CANCEL )
```

Fig. 14

```
INTERNET AUCTION SERVICE

MACHINE NAME: OUTBOARD MOTOR  ABC TYPE

SUGGESTED PRICE: [          ]

( REGISTRATION )    ( CANCEL )
```

MACHINE REMOTE MONITORING SYSTEM AND MANAGEMENT METHOD

BACKGROUND OF THE INVENTION

1. Field of the Invention

The present invention relates to a machine remote monitoring system and a management method, and in particular, to a machine remote monitoring system, which monitors operating conditions of a plurality of machines via communication, and to a management method for carrying out a management such as maintenance of machine based on the monitored result.

2. Description of the Related Art

Work machines, ships and vehicles, which are driven by an engine, must continue to operate for a long time while having a heavy load under severe conditions such as outdoor. For this reason, a suitable maintenance is required in order to normally operate these machines. Further, even if the work must be unavoidably interrupted due to the occurrence of failure, these machines must be repaired quickly and accurately so as to restore for a short time as much as possible.

On the other hand, the management of the above work machines is generally entrusted to a user such as an operator operating these machines, and further, the judgment of failure is made by the user. When a failure has been found, it is general that the user informs sales shop of the failure so as to receive a repair service.

However, in the case where the user makes the above judgment of failure, the user's judgment is delayed sometimes, as a result, a problem arises such that a failure is escalated. Further, the user can not accurately make the judgment of failure, for this reason, there is the case where the condition has not been fully confirmed until a service engineer goes to the place having the failure. In such case, a long time has already elapsed until the service engineer starts suitable repairs.

In view of the above circumstances, for example, a management apparatus for mobile work machines has been proposed in Japanese Patent Application Laid-Open No. 7-273714. In the above management apparatus, the operating condition data of the work machine is transmitted to a maintenance management section using a mobile radio communication device portable by an operator of the work machine, and then, the management section effectively makes an analysis relative to maintenance based on the transmitted data.

Further, a machine failure monitoring apparatus has been proposed in Japanese Patent Application Laid-Open No. 11-65645. In the above machine failure monitoring apparatus, when a failure or abnormal condition occurs, a failure signal and operating data at that time are automatically transmitted to the host computer via a network, and then, the data is stored as failure monitored history data. Further, maintenance timing is determined based on the history data, and emergency break is carried out.

Of the apparatuses described in the above Publications, in the former apparatus, when the operator connects the mobile radio communication device to a connector of data exchanger having modem, a data extracted from storage section is transmitted to the maintenance management section. Therefore, the operator's judgment is delay, and when no connection is made, the data is not transmitted, for this reason, there is the case where a failure is not found, or the finding-out is delayed. Further, the above apparatus described in the Publication has been proposed for the purpose of making easy maintenance of machine doing work within a limited area. For this reason, the above apparatus has not been proposed considering machines movable in a wide area, therefore, improvement is still required.

On the other hand, in the latter apparatus, the management station side can manage the judgment of failure occurrence and maintenance timing with respect to a plurality of work machines. However, in this case, the actual repair work greatly depends upon the service engineer's skill, for this reason, the user does not feel secure about his skill in view of quickness, and can not obtain satisfaction relative to the repair condition. Further, a problem arises such that it is difficult to secure communication security.

SUMMARY OF THE INVENTION

The present invention has been made in order to solve the above problems. Accordingly, an object of the present invention is to provide a machine remote monitoring system and a management method, which can give accurate failure diagnosis and high reliability and safety with respect to repair to a user.

In order to achieve the above object, according to a first aspect, the present invention provides a machine remote monitoring system comprising, means for identification information of call station in response to an incoming call, communication means which starts communication with the call station when the determining means makes a decision such that a call comes from a previously registered station, means for confirming an operating condition of machine connected with the call station based on the condition data transmitted from the call station in the communication, and information providing means for giving an information such that a failure occurs to a predetermined destination, for example, user and maintenance staff when the condition data is not a predetermined normal value or predetermined data showing an occurrence of failure.

According to a second aspect, the present invention provides a machine management method comprising the steps of, making an access to a remote monitoring apparatus from a communication device connected to a managed machine so as to transmit a condition data of the managed machine, carrying out troubleshooting so as to detect the cause of failure when the remote monitoring apparatus confirms an occurrence of failure based on the condition data, and giving a message of the occurrence of failure and the cause of failure decided by troubleshooting to a predetermined destination.

According to a third aspect, the present invention provides the machine management method, wherein troubleshooting is carried out using a program downloaded from the server via a network including a server serving as database.

According to a fourth aspect, the present invention provides the machine management method, wherein the detection result of the cause of failure by the troubleshooting means is transmitted to the server as history data together with the condition data.

According to a fifth aspect, the present invention provides the machine management method, wherein history data transmitted to the server is stored in the server, and an access is possible from any one of the maintenance staff and the user with previously allocated identification information.

According to a sixth aspect, the present invention provides the machine management method, wherein the remote monitoring apparatus displays the detection result of the cause of failure by the troubleshooting, maintenance parts required for taking suitable measures to the cause of failure, and an order screen for ordering the maintenance parts, and the order screen is operated so as to order the maintenance parts to a provider or maker included in the network.

According to the present invention, condition data representing the operating condition of machine is supplied to the managing side, that is, the remote monitoring apparatus by making an access from a managed machine side. The remote monitoring apparatus makes a decision whether or not a failure occurs based on the condition data, and carries out troubleshooting for the failure. Therefore, it is possible to determine the failure based on the condition data before a failure is detected in the machine side, as well as when the failure is detected in the machine side. In particular, the troubleshooting program is downloaded from the data base storing the latest information, therefore, suitable troubleshooting is possible.

Further, communication is started by the access from the machine side, and thereafter, the condition data is transmitted, therefore, high security can be secured in the machine side. In addition, maintenance parts can be ordered immediately when the troubleshooting result is given, therefore, it is possible to quickly perform maintenance.

DETAILED DESCRIPTION OF THE PREFERRED EMBODIMENTS

The present invention will be described below with reference to the accompanying drawings.

Figure 1:
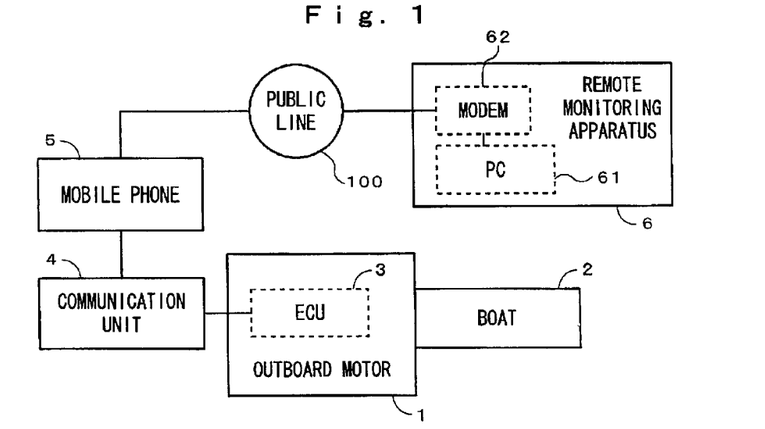
FIG. 1 is a block diagram showing a configuration of remote monitoring system according to one embodiment of the present invention.

FIG. 1 is a block diagram showing a configuration of outboard motor monitoring system according to one embodiment of the present invention. In FIG. 1, an outboard motor (engine) 1 is mounted in a boat 2, and further, includes a controller or an engine control unit (ECU) 3. The ECU 3 is connected to a communication unit 4 via a dedicated communication interface so that the ECU 3 and the communication unit 4 can mutually make data communication. The communication unit 4 is connected to a mobile phone 5, and the mobile phone 5 makes communication with the outside according to the instructions from the communication unit 4. The ECU 3 transmits detection data (described later) detected by various sensors included in the outboard motor 1 to the communication unit 4. The communication unit 4 transmits the detection data as condition data of the outboard motor 1 to a public line 100 via the mobile phone 5.

On the other hand, a remote monitoring apparatus 6 has a personal computer 61 and a modem 62 connected to the public line 100. The personal computer 61 has a function of expressing the condition data of outboard motor 1 received from the mobile phone 5 via the public line 100 by chart and graph.

In the system having the above configuration, in order to transmit the above condition data, the communication unit 4 makes a call to the remote monitoring apparatus 6 at a predetermined time or for each predetermined time. The remote monitoring apparatus 6 makes a response to only call from the outboard motor 1 side, and then, can make communication with the communication unit 4. In other words, the system is constructed in a manner that communication is not made even if the remote monitoring apparatus 6 makes an access to the outboard motor 1 side. In this case, the access from the outboard motor 1 side is not limited to the above timing, and maybe made when the outboard motor 1 starts to operate and when the ECU 3 detects a failure of the outboard motor 1.

In the case of the outboard motor 1, management such as maintenance is entrusted to a marina mooring boats, and in the case of sailing, the sailing procedure is made in the marina. As described above, there are many cases where the marina generally manages boat sailing and maintenance of the outboard motor 1. Therefore, it is preferable that the remote monitoring apparatus 6 is located in the marina. Preferably, in the marina, the data from plural outboard motors 1 is received and managed by one personal computer 61.

Figure 2:
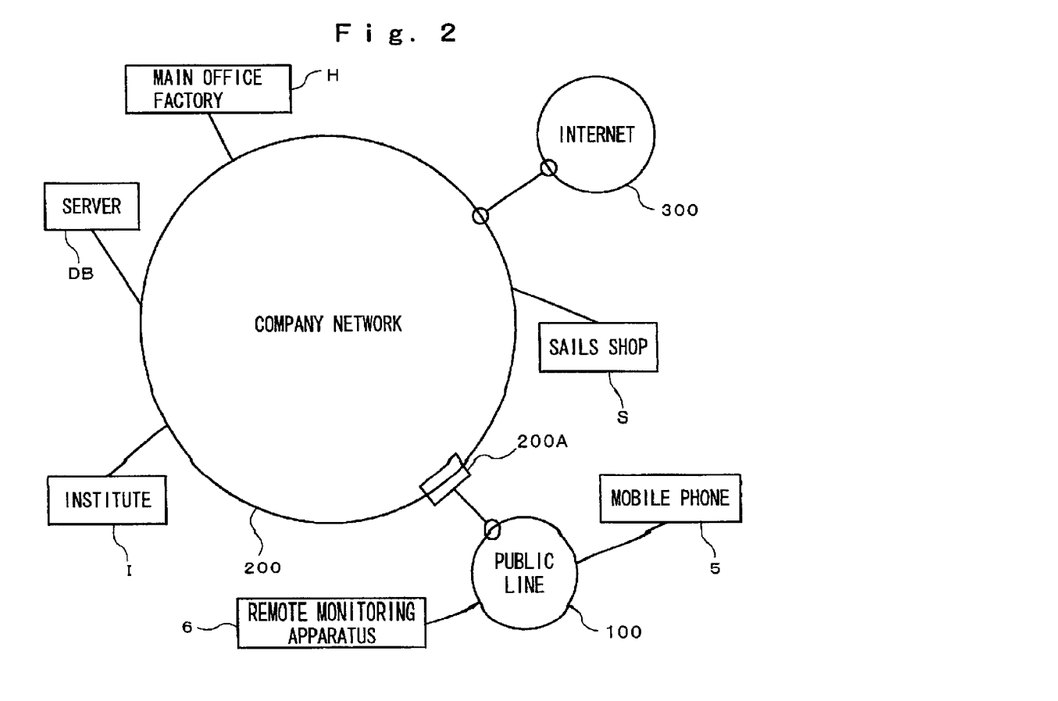
FIG. 2 is a view showing a configuration of wide band network including a remote monitoring apparatus according to one embodiment of the present invention.

FIG. 2 is a view showing a configuration of wide area network system including the remote monitoring apparatus 6. In FIG. 2, a leased line network 200 administrated by a maker company of the outboard motor 1 is connected with each computer of the maker main office and factory H, institute I and sails shops S and a database server (hereinafter, referred to as "server") DB. The remote monitoring apparatus 6 of the marina and the mobile phone 5 of the outboard motor 1 are connected to the company network 200 via the public line 100. The company network 200 and the public line 100 are connected via a gateway unit 200A. Further, the company network 200 is connected to Internet 300. In this case, the remote monitoring apparatus 6 may be directly arranged on the company network 200 without connecting the public line 100.

Figure 3:
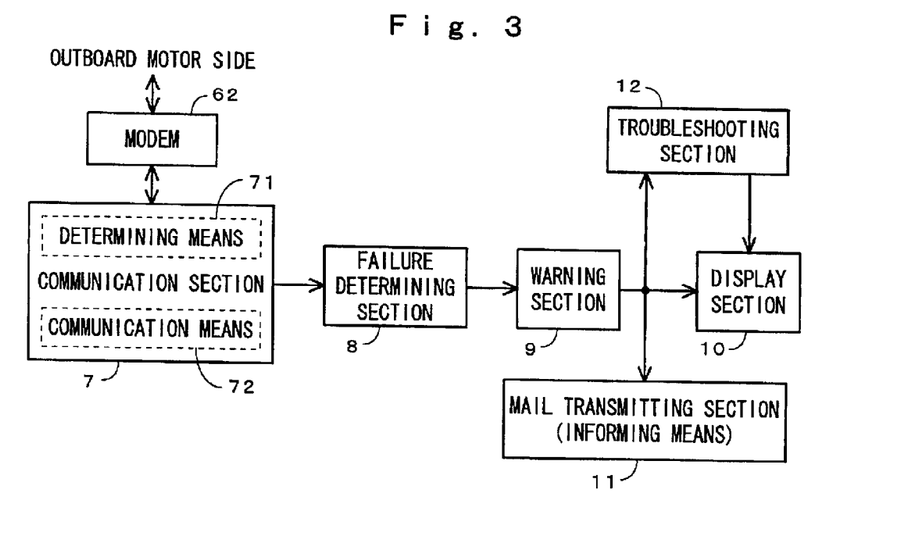
FIG. 3 is a functional block diagram showing principal parts of the remote monitoring apparatus.

Next, the following is a description on an operation of monitoring the outboard motor 1 by the remote monitoring apparatus 6 on the network. FIG. 3 is a functional block diagram showing principal parts of the remote monitoring apparatus 6. Preferably, the remote monitoring apparatus 6 is always operated, however, the remote monitoring apparatus 6 is not necessarily so operated. Usually, the remote monitoring apparatus 6 is made into a suspended state, and when the modem 62 detects a signal from the public line 100, the personal computer 61 may fully start up.

A communication section 7 has a determining function (determining means 71). The determining means 71 collates peculiar identification information ID or a number allocated to product or the outboard motor 1 inputted from the communication unit 4 of the outboard motor 1 side, with previously registered data in response to incoming call. More specifically, the determining means 71 makes a decision whether the incoming call is unfair reception, that is, it is an incoming call from stations other than previously registered station. Then, when it is confirmed that the incoming call is fair reception, the communication means 72 starts bi-directional communication with the outboard motor 1. As described above, the communication is started only when the access from the outboard motor 1 side is made, and thereby, it is possible to prevent communication from being made when unfair access is made to the communication unit 4.

Figure 4:
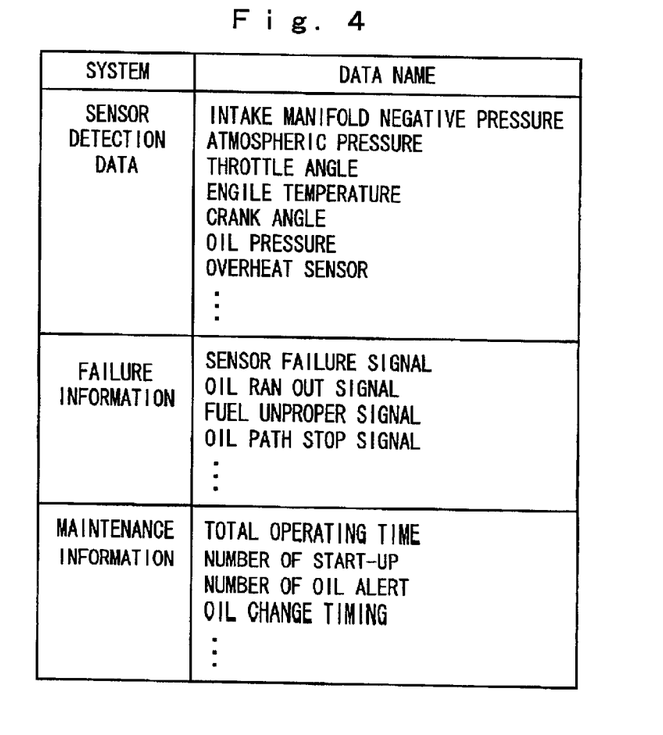
FIG. 4 is a view showing an example of condition data.

When the communication is made, a failure determining section 8 makes a decision whether or not a failure occurs in the outboard motor 1 side, that is, determines an operating condition of the outboard motor 1 based on the condition data from the outboard motor 1. FIG. 4 is a view showing condition data. The condition data includes sensor detection data such as engine temperature, failure information such as electric short and open of sensor signal indicative of the condition that a failure actually occurs, and maintenance information such as the total operating time used for determining maintenance timing.

The above condition data is periodically transmitted to the remote monitoring apparatus 6 from the communication unit 4 at predetermined frequency such as one time for five minutes. Subsequently, the following is a description based on the assumption of the condition that a cooling water passage stop up, as a result, the engine is likely to overheat.

The failure determining section 8 shown in FIG. 3 monitors a change of engine temperature periodically transmitted, that is, a rise rate of temperature, and has a function of detecting overheat based on the rise rate. A warning section 9 outputs a warning signal indicative of the occurrence of failure when inputting a signal of detecting overheat or sign of overheat from the failure determining section 8. The warning signal is supplied to a display section 10, and then, an alarm showing the overheat is displayed on a screen of the display section 10.

Further, the warning signal is inputted to a mail transmitting section 11 used as informing means, and then, the mail transmitting section 11 may give overheat detection information to a previously registered address via E-mail. In this case, a plurality of addresses may be registered. As described above, the occurrence of failure is transmitted via E-mail, and thereby, a maintenance staff of marina has no need of watching the remote monitoring apparatus 6, and therefore, can continue failure monitoring while doing other maintenance work at a remote place.

The content of warning displayed on the display section 10 and the maintenance staff's mobile phone includes data for specifying the user, ID of the communication unit 4, failure contents, maintenance history (e.g., oil change history relative to overheat) and the like. The maintenance staff can determine the failure content based on the displayed content. Therefore, by the judgment of the maintenance staff, it is possible to give a message such that there is a fear of overheats to the boat 2 equipped with the outboard motor 1 by wireless and mobile phone. The boat 2 receives the message, and can confirm the failure, therefore, the boat 2 can take suitable measures of reducing a speed in order to relieve the overheat, and coming back to the marina.

Of course, the ECU 3 of the outboard motor 1 can detect the overheat from an output from an overheat sensor provided in the outboard motor 1. In this case, it is possible to carry out a control for automatically reducing an engine speed of the outboard motor 1. However, the failure determining section 8 of the remote monitoring apparatus 6 can expect the occurrence of overheat judging from a degree of the rise of engine temperature, therefore, it is possible to prevent the occurrence of overheat.

Whether or not a measures after the warning is displayed and its contents may be entrusted to the judgment of maintenance staff. In this case, the personal computer 61 may have a function of automatically determining a degree of emergency for taking measures to the failure from the maintenance history and the rise rate of engine temperature, and displaying it on the display section 10.

Further, based on the warning signal from the failure determining section 8, information for troubleshooting can be displayed on the display section 10. A troubleshoot section 12 has a program for displaying the cause corresponding to the failure, and detects the cause of failure corresponding to the failure content included in the warning signal so as to display the failure content and the cause of failure on the display section 10. Therefore, the maintenance staff of marina can give suitable measures for repairing the failure to the boat based on the displayed cause of failure, and can go out for maintenance by himself.

A program stored in the troubleshooting section 12 may be data of storage medium previously provided from a maker for each product, and may be downloaded from the server DB of the maker. The data is downloaded from the server DB, and thereby, it is possible to carry out troubleshooting with higher accuracy based on the latest updated data of the maker.

In the above embodiment, the condition data has been transmitted from the communication unit 4 at the frequency of one time for five minutes. The transmission frequency may be determined by a predetermined monitoring level. As described above, the condition data is periodically transmitted to the remote monitoring apparatus 6, and thereby, it is possible to estimate overheat before a failure such as overheat occurs. Further, in addition to periodic transmission, the condition data may be transmitted periodically when the operation starts, as described above. Furthermore, when a failure is detected by means for detecting failures such as overheat, which is provided in the ECU3 of the outboard motor 1, the data indicative of the failure condition can be immediately transmitted to the remote monitoring apparatus 6 when a failure is detected, in addition to the periodic transmission at the above frequency.

Figure 5:
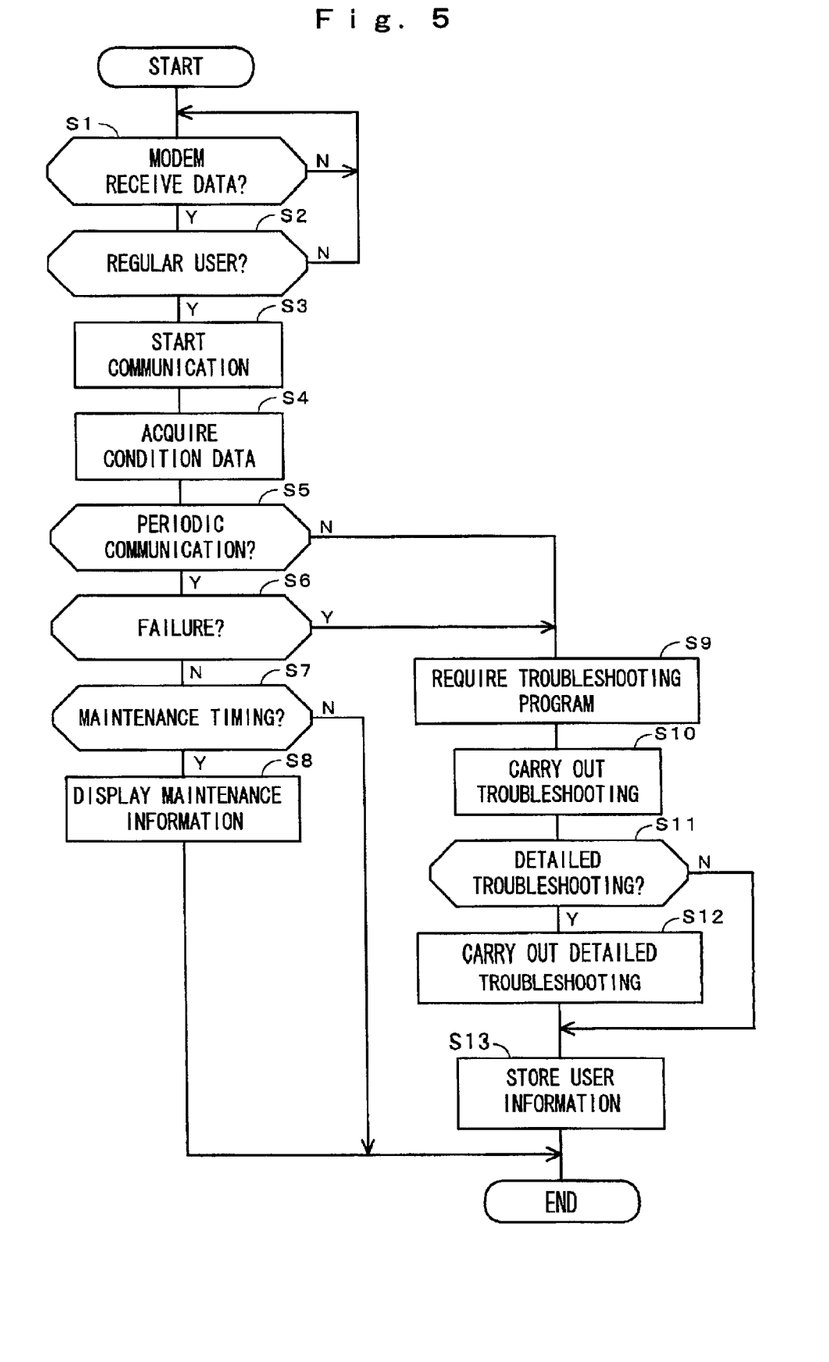
FIG. 5 is a flowchart showing a principal operation of the remote monitoring apparatus.

Subsequently, a monitoring operation including the above failure detection will be described more in detail below with reference to the flowchart. FIG. 5 is a flowchart showing a monitoring operation including failure detection. In step S1, a decision is made whether or not the modem 62 receives the data. If the reception is detected, the control sequence proceeds to step S2, it is confirmed whether or not the reception is access from regular users based on the identification information (ID). If it is access from regular users, in step S3, an acknowledge signal is transmitted to the communication unit 4 so that communication is started. In step S4, the condition data is acquired. In step 5, a decision is made whether or not the reception is periodic communication for each predetermined time. If it is periodic communication, the control sequence proceeds to step S6 (YES), and then, a decision is made whether or not there is a failure based on the condition data. If there is no failure, the control sequence proceeds to step S7, and then, a decision is made whether or not maintenance timing, for example, oil change timing comes based on oil change history. According to the above judgment result, in step S8, maintenance information, for example, a message of suggesting "oil change" is displayed on the display section 10.

On the other hand, if the reception is not periodic communication in step S5 (NO), a decision is made such that the ECU 3 of the outboard motor 1 side detects a failure, and the result is transmitted, and then, in steps after step S9, troubleshooting is carried out. When a decision is made such that there is a failure in step S6, the control sequence proceeds to steps S9. In this case, a program for troubleshooting is downloaded from the server DB, and then, troubleshooting is carried out.

First, in step S9, a demand of troubleshooting program is made to the server DB. In response to the requirement, the latest program is downloaded from the server DB, and thereafter, in steps S10, troubleshooting is carried out according to the downloaded program, and then, the result is displayed on the display section 10. The maintenance staff watches the displayed troubleshooting result, and then, can take suitable measures. The server DB is provided with the latest troubleshooting method from the institute I, therefore, more suitable troubleshooting is possible.

Figure 7:
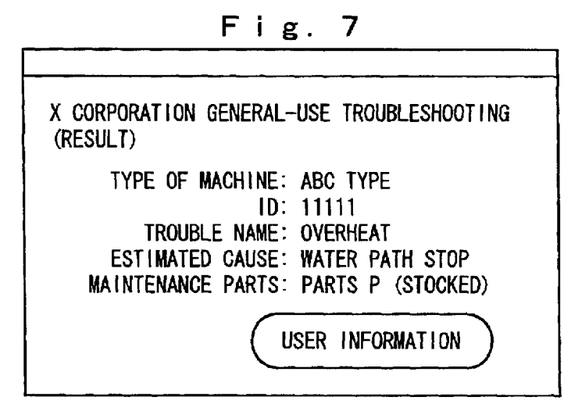
FIG. 7 is a view showing a screen display of an example of troubleshooting result.

When the cause of failure is decided according to troubleshooting, information as shown in FIG. 7, which will be described later, is displayed on the display section 10. In the case where the cause of failure is not specified by only condition data from the outboard motor 1 side, detailed troubleshooting is carried out. A program for detailed troubleshooting can be acquired from the server DB. The maintenance staff acquires new condition data while making contact with the user, according to the program for detailed troubleshooting, and thereby, can decide the cause of failure. Namely, the maintenance staff inputs the newly acquired condition data according to the procedure of troubleshooting, and then, can find out the cause of failure.

In step S11, a decision is made whether or not detailed troubleshooting is carried out. The instruction for the judgment is made by the maintenance staff. In step S12, detailed troubleshooting is carried out. In the case where the cause of failure is decided, the troubleshooting result is stored in the server DB as user information in step S13.

Figure 6:
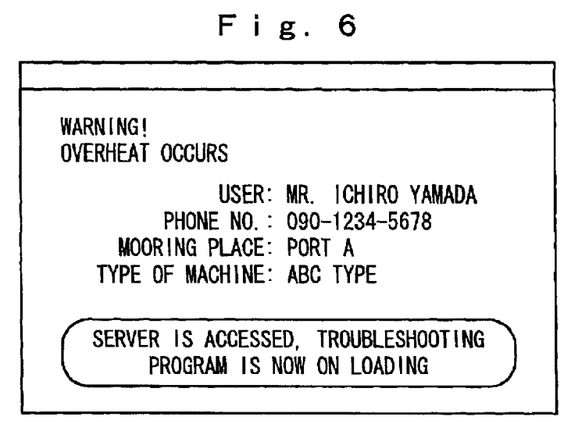
FIG. 6 is a view showing a screen message displayed on the remote monitoring apparatus in an incoming call from a outboard motor.

FIG. 6 shows a display screen of the display section 10 when the occurrence of failure is detected, and FIG. 7 shows the troubleshooting result. FIG. 7 shows a display screen of the case where the overheat sensor of the outboard motor 1 detects overheat, and transmits a failure signal as condition data. In addition, in the case where the boat 2 includes a self-position detector (GPS) for giving current position information to the remote monitoring apparatus 6, the current position can be displayed on the display section 10. Further, the position of the boat 2 may be displayed on a map based on map information previously stored in the personal computer 61 and the position information.

When the cause of failure is decided according to troubleshooting, trouble information, that is, information that a failure occurs or is likely to occur is given to the boat 2 by the mobile phone and mail. Necessary parts are determined when the cause of failure is decided, therefore, the necessary parts can be ordered via the network. For example, a parts center is connected to the company network 200, and an access is made to the parts center so as to confirm stock and order it. The confirmation result of the stock is displayed together with part name as shown in FIG. 7.

Figure 8:
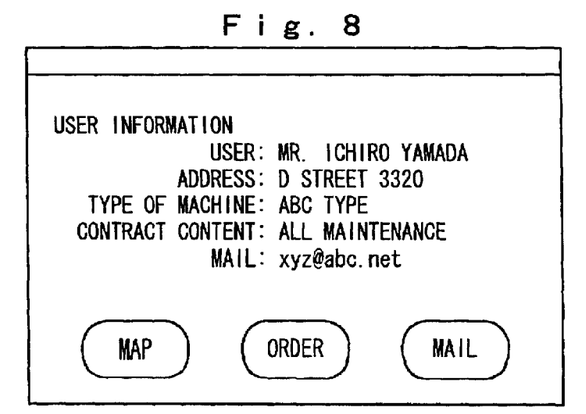
FIG. 8 is a view showing a screen display for selecting a procedure after troubleshooting.

FIG. 8 shows a parts order screen having a contract content of all maintenance. In the case where the contract content is all maintenance, the order of the identified part is previously approved by the user, therefore, an "order" button on the screen is clicked, and thereby, the part is ordered. Further, a "mail" button is clicked, and thereby, trouble information corresponding to the cause of failure is given to the user. In addition, a "map" button is clicked, and thereby, it is possible to display a map showing outside repair shop for maintenance.

Figure 9:
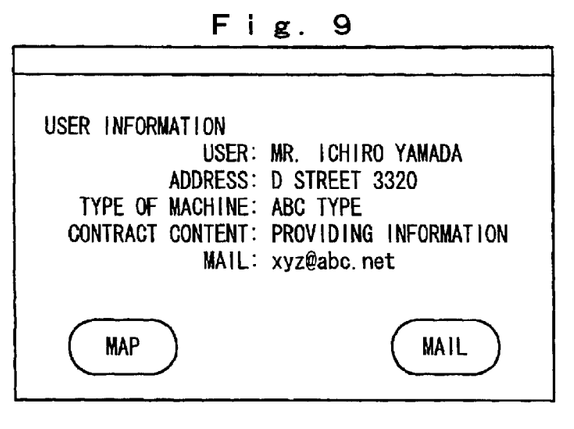
FIG. 9 is a view showing a screen display for giving information on the procedure after troubleshooting to a user.

In the case where the contract content with the user is "contract of providing information", an information providing screen to the user is displayed. FIG. 9 is a view showing a display screen of the display section 10 in the case where the contract content with the user is "contract of providing information". A "mail" button on the screen is clicked, and thereby, trouble information and maintenance cost are transmitted to predetermined user's mail address. In this case, information providing to the user is not limited to the mail, and may be performed by communication means such as telephone, facsimile, etc.

Figure 10:
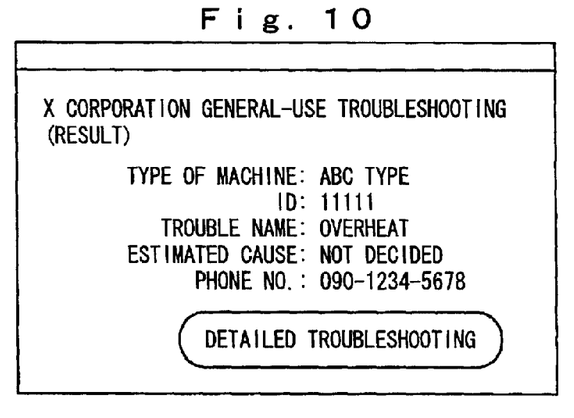
FIG. 10 is a view showing a screen display of troubleshooting result when the cause of failure is not decided.

FIG. 10 is a view showing a display screen of the display section 10 in the case where the cause of failure is not decided by only condition data from the outboard motor 1 side. The screen is provided with a "detailed troubleshooting" switch. The maintenance staff clicks the switch, and thereby, a demand of program for detailed troubleshooting is made with respect to the server DB.

In the case where the cause of failure is decided, the troubleshooting result is stored in the server DB as user information correspondingly to user name. The maintenance staff clicks the "user information" button on the screen shown in FIG. 7, and thereby, the troubleshooting result can be stored in the server DB as user information.

The user information stored in the database DB is used in the head office and factory H, the institute I, etc. For example, the institute I acquires the user information from the server DB, and confirms "machine used information, environmental requirement (durable temperature), failure occurring place" or the like. On the other hand, the head office and factory H confirms "condition for each district, claim information" or the like, and can use the information for development and sale.

The user information stored in the server DB is not only used for development and sale, but also used as useful maintenance information to the user. The company network 200 including the server DB is connected to the Internet 300. Therefore, the user designates a server URL, and then, inputs previously registered user name and password, and thereby, can make an access to the server DB on the company network 200 via the Internet 300. The server DB has a function of making a response to the access from the user, and processing the user information into a format such that the user is easy to see. Further, in response to the access from the user, it is possible to provide maintenance information about the outboard motor in which the user possesses, and to provide service for introducing optional parts based on new product information stored in the server DB.

Figure 11:
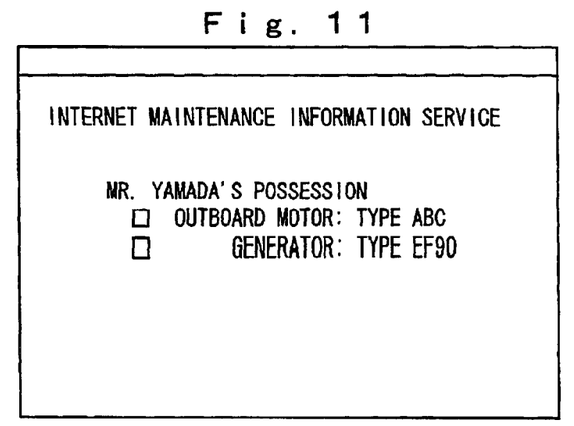
FIG. 11 is a view showing a screen display for providing user information to the user.

FIG. 11 is a view showing information displayed on user's personal computer in response to the access from the user. The information as described above is displayed, and then, when the user clicks a check box positioned ahead the product name, detailed information for the product is displayed.

Figure 12:
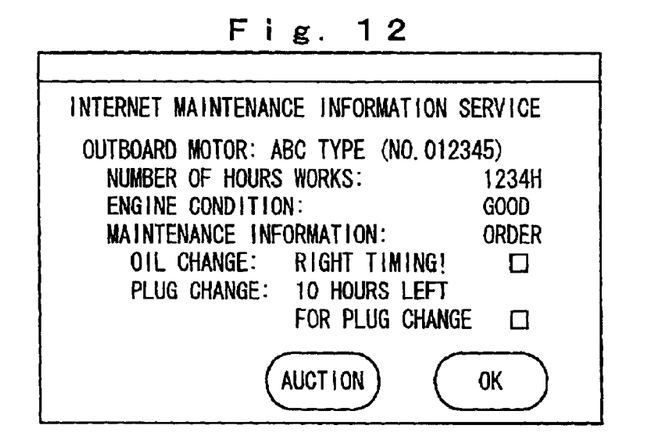
FIG. 12 is a view showing a screen display for providing maintenance information to the user.

FIG. 12 is a view showing a detailed information display screen for product. As shown in FIG. 12, a list of parts requiring maintenance or parts having maintenance timing coming soon is displayed. When the user checks an "order" box of the corresponding parts, and clicks an "OK" button, the screen is transferred to an order screen.

Figure 13:
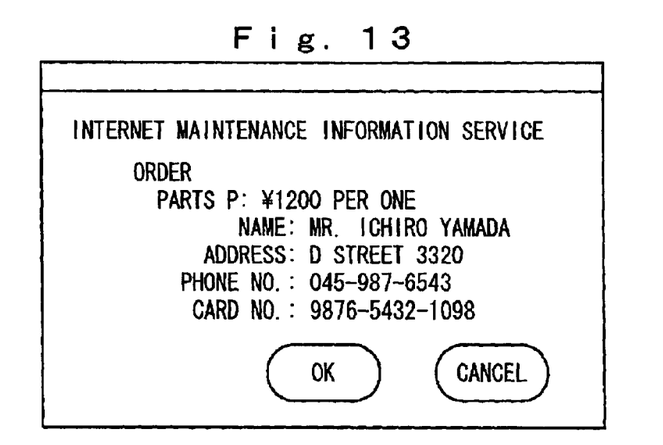
FIG. 13 is a view showing a screen display for ordering parts based on maintenance information.

FIG. 13 is a view showing an order screen outputted to the user's personal computer. As shown in FIG. 13, previously registered destination and payment card number are displayed on the order screen. Based on information displayed on the order screen, when the user clicks an "OK" button for confirmation, the order of parts requiring maintenance is completed.

Figure 14:
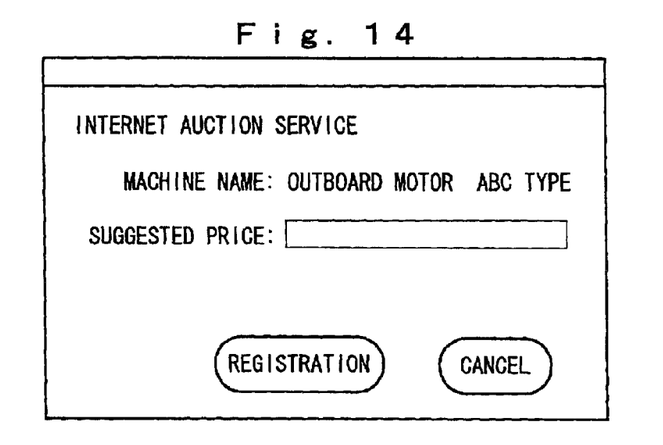
FIG. 14 is a view showing a screen display for Internet auction.

Further, when the user clicks an "auction" button on the display screen shown in FIG. 12, the screen is transferred to a screen for selling the corresponding product at Internet auction. FIG. 14 is a view showing an Internet auction display screen. The user inputs a desired selling price and clicks a "registration" button on the screen shown in FIG. 14, and thereby, the registration for Internet auction is completed.

As described above, according to this embodiment, the condition data of the outboard motor 1 is given periodically and automatically to the remote monitoring apparatus 6 of marina when the operation starts, when a failure occurs and regardless of the occurrence of failure. Then, the remote monitoring apparatus 6 confirms the condition of the outboard motor 1 based on the condition data, and carries out troubleshooting when a failure is detected. Further, in the case where the cause of failure is not decided by only condition data automatically transmitted from the outboard motor 1, the program for detailed troubleshooting is acquired from the server DB of maker, and then, according to the acquired program, the maintenance staff supplements new condition data so as to carry out an investigation.

The troubleshooting result is collectively managed as user information by the server DB, therefore, sales and institute sections accessible to the server DB can carry out effective sale and development based on the user information. Further, the user inspects the user information via Internet, and then, can make use of the order of parts and Internet auction.

This embodiment has described the monitoring apparatus of the outboard motor 1 and the management method. The present invention may be applicable to other machines, for example, engine generators. More specifically, engine condition data is transmitted via mobile phones while a sales shop is provided with the remote monitoring apparatus, and then, the sale shop monitors and manages the engine generator.

In the above embodiment, the mobile phone has been used as communication means from the outboard motor 1. The present invention is not limited to the above communication means. In particular, the mobile phone can not make communication on the marine several tens of kilometers away from the coast, for this reason, in such a case, wireless communication means such as ship station radio is used.

As is evident from the above description, according to the present invention, the maintenance side providing the remote monitoring apparatus can monitor user's machine condition based on the condition data. Based on the monitored result, suitable judgment to failure and information on maintenance are given to the user side, therefore, it is possible to give reliability and safety to the user using the machine.

The condition data is monitored, therefore, it is possible to find a failure before the user takes notice of it. In addition, the condition data is monitored, therefore, it is possible to carry out accurate failure diagnosis. Thus, when the user finds a failure and makes contact with the maintenance side, the maintenance side already grasps the machine condition, and finishes troubleshooting for the failure. Therefore, the maintenance staff can immediately prepare maintenance parts, and can leave for the user to repair, as a result, quick and accurate maintenance is possible. The above troubleshooting is carried out according to the latest program acquired from the server, therefore, suitable failure diagnosis can be performed.

The condition data is transmitted to the maintenance side by only access from the machine side, therefore, high security can be secured. The user information including failure data is stored in the server, therefore, the user makes an access to the server, and can use the data as information for maintenance and operation.

What is claimed is:

1. A machine remote monitoring system comprising:
    means for determining identification information of a mobile call station in response to an incoming call from a mobile communication apparatus;
    communication means which starts communication with the mobile call station via the mobile communication apparatus when the determining means makes a decision that the incoming call comes from a previously registered station;
    means for confirming an operating condition of a machine on the mobile call station based on the condition data transmitted from the mobile call station in the communication;
    information providing means for giving an information to a predetermined destination that a failure occurs when a condition data is not of a predetermined normal value or predetermined data showing an occurrence of failure; and
    troubleshooting means, which starts up a predetermined program when it is confirmed that the failure occurs based on the condition data, and detects the cause of failure, and contents given by the information providing means includes the cause of failure decided by the troubleshooting means.

2. The machine remote monitoring system according to claim 1, wherein the system is connected with a network including a server serving as database, and the program is downloaded from the server via the network.

3. The machine remote monitoring system according to claim 2, wherein the detection result of the cause of failure determined by the troubleshooting means is transmitted to the server as history data together with the condition data.

4. A machine management method comprising the steps of:
    making an access to a remote monitoring apparatus from a communication device with a mobile communication apparatus connected to a mobile managed machine so as to transmit a condition data of the managed machine at every predetermined time and whenever a failure is detected or at one of these occasions;
    carrying out troubleshooting so as to determine a cause of failure when the remote monitoring apparatus confirms an occurrence of failure based on the condition data which includes a failure data that is detected in the machine; and giving a message of the occurrence of failure and a cause of failure determined by the troubleshooting step to a predetermined destination;

wherein an access to the remote monitoring apparatus from the communication device with the mobile communication apparatus is made with identification information previously allocated to the mobile managed machine, and the remote monitoring apparatus is started up in response to the access.

5. The machine management method according to claim 4, wherein troubleshooting is carried out using a program downloaded from a server via a network including the server serving as a database.

6. The machine management method according to claim 5, wherein the remote monitoring apparatus displays the detection result of the cause of failure determined by the troubleshooting step, maintenance parts required for taking suitable measures to the cause of failure, and an order screen for ordering the maintenance parts, and the order screen is operated so as to order the maintenance parts to a provider or maker included in the network.

7. The machine management method according to claim 5, wherein the detection result of the cause of failure by the troubleshooting step is transmitted to the server as history data together with the condition data.

8. The machine management method according to claim 5, wherein the remote monitoring apparatus displays the detection result of the cause of failure determined by the troubleshooting step, maintenance parts required for taking suitable measures to the cause of failure, and an instruction screen for providing information about cost required for maintenance to the user, and the instruction screen is operated so as to make an inquiry for taking desired measures to the user.

9. The machine management method according to claim 4, wherein the condition data is transmitted whenever the mobile managed machine starts to operate.

10. The machine management method according to claim 4, wherein the destination is at least one of a maintenance staff of the mobile managed machine and a user of the mobile managed machine.

11. The machine management method according to claim 10, wherein history data transmitted to the server is stored in the server, and an access is possible from any one of the maintenance staff and the user with previously allocated identification information.

12. The machine management method according to claim 4, wherein the detection results of the cause of failure by the troubleshooting step is transmitted to a server as history data together with the condition data.

13. The machine management method according to claim 4, wherein the remote monitoring apparatus display the detection result of the cause of failure determined by the troubleshooting step, maintenance parts required for taking suitable measures to the cause of failure, and an order screen for ordering the maintenance parts, and the order screen is operated so as to order the maintenance parts to a provider or maker included in the network.

14. The machine management method according to claim 4, wherein the remote monitoring apparatus displays the detection result of the cause of failure determined by the troubleshooting step, maintenance parts required for taking suitable measures to the cause of failure, and an instruction screen for providing information about cost required for maintenance to the user, and the instruction screen is operated so as to make an inquiry for taking desired measures to the user.

* * * * *